United States Patent [19]
Grove, Sr.

[11] Patent Number: 5,927,915
[45] Date of Patent: Jul. 27, 1999

[54] SAFETY RACK FOR A COIL

[76] Inventor: PerLee D. Grove, Sr., 10773 N Knoll, Beach City, Ohio 44608

[21] Appl. No.: 08/909,627

[22] Filed: Aug. 12, 1997

[51] Int. Cl.$^6$ .................................................. B60P 7/12
[52] U.S. Cl. .................................................. 410/49; 410/50
[58] Field of Search .................................. 410/47, 48, 49, 410/50; 211/13.1; 248/146, 346.01; 105/362; 206/389, 446

[56] References Cited

U.S. PATENT DOCUMENTS

| | | |
|---|---|---|
| 3,387,811 | 6/1968 | Adams, Jr. . |
| 3,606,230 | 9/1971 | Hargreaves . |
| 3,637,234 | 1/1972 | Thomas et al. ............... 410/50 |
| 3,715,993 | 2/1973 | Orlik .......................... 410/48 |
| 3,807,759 | 4/1974 | Vornberger ................... 410/50 |
| 3,829,148 | 8/1974 | Stoneburner .................. 410/49 |
| 4,013,256 | 3/1977 | Hill . |
| 4,382,733 | 5/1983 | Rodgers ....................... 410/49 |
| 5,067,871 | 11/1991 | Hilber . |
| 5,191,842 | 3/1993 | Tinkler .................... 410/47 X |
| 5,346,165 | 9/1994 | Frean et al. . |
| 5,425,608 | 6/1995 | Reitnouer ..................... 410/49 |
| 5,441,220 | 8/1995 | Carlson . |
| 5,577,619 | 11/1996 | Callahan ................... 410/49 X |
| 5,607,133 | 3/1997 | Markham et al. . |

FOREIGN PATENT DOCUMENTS

| | | | |
|---|---|---|---|
| 838429 | 4/1970 | Canada ...................................... 410/49 |
| 655601 | 4/1979 | U.S.S.R. .................................. 206/389 |

*Primary Examiner*—Stephen T. Gordon
*Attorney, Agent, or Firm*—Jacobson, Price, Holman & Stern, PLLC

[57] ABSTRACT

A rack for securing large, heavy, industrial sized cylindrically shaped objects, such as coils, on the flatbed of a vehicle for transportation, made from two parallel angle beams welded to at least two cross-members disposed perpendicular to the beams. Each beam has an inside inclined portion facing inwardly and covered with a rubber insert to carry the weight of the coil. The outwardly facing inclined portion of the angle beam supports the inside portion from collapse. A header beam on an end of the beam pair prevents longitudinal movement of the coil out of the rack. There is also a device for securing the rack to the flatbed using pins received through the cross-members and the floor of the flatbed. Alternatively, the rack can be secured with a stopper and tongue secured to the flatbed to be received by a slot either in the header beam or formed in a structure atop an extended cross-member. Additionally, the rack may be disposed on the flatbed either aligned with the length of the flatbed or rotated 90 degrees.

18 Claims, 3 Drawing Sheets

SAFETY RACK FOR A COIL

BACKGROUND OF THE INVENTION

1. Field of the invention

The present invention relates to a rack or carrier for cylindrically shaped heavy objects. Specifically, the invention relates to a portable carrier adapted to prevent the sliding and rolling of a heavy object such as a coil positioned horizontally during transportation on the flatbed of a truck or other vehicle.

2. Description of Related Art

In the field of transportation of heavy cylindrical objects such as large industrial sized coils of stock material, it is important to prevent the rolling or shifting of the object to prevent hazardous conditions that pose injury to workers and property. Coils or rolls of stock material, such as sheets of aluminum, steel, mill-rolls, belting, or the like, are frequently transported from a point of origin, such as the manufacturer, to their destination, such as a buyer, on the top of the flatbed of a truck or other vehicle.

These coils can weigh as much as 15 to 25 thousand pounds, the length of the coil may vary up to 4 feet, and the diameter is usually approximately four feet. Typically, these coils are loaded onto tractor trailers, such as a flatbed, dump bed, open-top, or freight box, by either crane or forklift, depending upon the loading capabilities of the manufacturer, for transportation. A crane would load each coil one behind another with their lengths aligned with the length of the trailer. When a forklift is used each coil is loaded one next to another from a longitudinal side of the trailer so that the coil length is oriented transversely to the length of the trailer. This latter positioning is referred to in the transportation industry as a "vertical" or "suicide" position due to the increased likelihood that a coil may start rolling along the direction of the trailer's travel due to generated inertial forces. Depending upon the length of the coils to be transported, they may be stacked one behind the other to fill the rack or racks as the case may be. The trailers used in transporting coils are usually also used for other transportation purposes. Therefore, the means employed to secure the coil to the flatbed are normally capable of being removed from the flatbed.

Heretofore, a coil of the type to which the present invention is directed would be placed on top of a removable set of two parallel wooden beams with square cross-section, such as 4 inch by 4 inch conventional wooden beams. The beams keep the coil off the ground or supporting surface and serve as two edges of contact with the coil. The coil should not touch the ground or support surface because that causes the coil to roll back and forth between the beams. Certain manufacturers require the beams to have a bevel along the top longitudinal edge facing the coil to prevent sharp edges from impacting against the coil and potentially damaging said coil. These parallel beams are held in their relative position using two cross members, usually flat strips of ¼ inch thick galvanized steel, that extend underneath and perpendicularly to each parallel beam. At each end, these cross members are bent upwardly, then backwardly toward the opposite end, and finally downwardly, to form a generally D-shaped or triangularly shaped back stopper disposed on the outside of the beams to maintain their relative parallel position. These parts are not attached to one another, which assists in removal of the set-up.

Using this set-up, a coil is placed on top of and between the parallel beams atop the cross-members. The coil is then tied down to the trailer bed with chains and chain binders. These chains are typically placed laterally over the coil with the ends of the chains secured to the trailer and tension supplied to the chains through conventional chain binders. Additional chains may be placed longitudinally along the coil through its central core and tied to the trailer similarly.

The prior art as described above is conventional and well known in the industry and the field of art of the present invention. The applicant has found, as has the industry itself, that this securing system poses threats to the safety of workers and possibly other vehicles on the road.

It is important for security and safety to assure that a coil does not shift or roll in any manner during transportation. Once any slack occurs in the tension of the securing chains that might be caused by rolling or shifting of the coil during transport, the rack set-up may be potentially dangerous. This situation can cause the coil to further shift and/or roll, which will cause more deterioration of the set-up. Because the parts of the rack set-up are not securely attached to one another or to the flatbed support surface, the shifting of the parts can lead to eventual failure of the set-up causing the coil to essentially be without restraints. Under conditions of transportation of such a heavy object, the coil can obtain a devastating energy from inertia that can cause tremendous risks to life and property if the coil breaks free.

An additionional danger of this set-up is the back stoppers formed from the curved D-shaped portions of the cross-members that are susceptible and known to collapse or deform, either under static load from the coil or under dynamic loads caused by the shifting of the coil when it has become loose or by the jarring and shaking of the coil caused from undulations and imperfections in a road surface. Further, this type of set-up provides no provision for preventing the sliding of the coil in its length-wise direction.

Racks for securing cylindrically shaped objects are shown, for example, in U.S. Pat. Nos. 3,387,811; 4,013,256; 4,382,733; 5,067,871; 5,346,165; 5,441,220; and 5,607,133. However none of these racks are suitable for carrying cylindrically shaped objects or coils of the type intended for the present invention.

SUMMARY OF THE INVENTION

The present invention offers features previously unavailable for transporting large and heavy cylindrically shaped objects or coils in a horizontal position on the flat-bed of a vehicle. The invention is an improvement over previously used racks in that it improves the secure positioning of the cylindrical object or coil and prevents sliding or rolling of the coil to avoid a serious safety hazard.

According to the present invention there is provided a device for securing the coil on a flatbed of a vehicle. The device is a unitary, one-piece, light weight rack that fits onto the flat-bed of a vehicle. The material of the rack may be of any strong, rigid material such as metal or plastic. Lightweight materials such as aluminum or an alloy thereof are preferred.

The rack of the present invention provides two inclined surfaces that face inwardly toward and on opposite sides of the cylindrical object or coil to be transported. These inclines tend to smooth and distribute the contact points between the coil and the surfaces to prevent damage therefrom to the coil while simultaneously securing the object or coil from rolling. Two aluminum angle support beams positioned parallel to each other with the apex of each beam pointing upwardly preferably provide this function. With the angle beams so positioned, the outwardly facing portion of the support beams serve to rigidify the inwardly facing surface of the beam along the entire top edge, thus decreasing the likelihood of collapse and providing increased safety. This advantage is particularly desirable when the cylindrical object is carried in the "vertical" or "suicide" position. In this position, the object or coil has an increased tendency to roll forward or backward in the direction of movement when the vehicle decreases or increase its speed. The rigidity of the beams enhances the capability of the rack not to collapse and thereby not to allow the object in the rack to roll forward toward the driver's cabin on a tractor trailer or backward toward the end of the vehicle.

The rack of the present invention also provides that these angle beams be secured in place, such as by welding or the like, on top of at least two flat cross-members that are disposed generally perpendicularly to the parallel angle beams. The cross-members extend beyond the outer edges of the support beams and are preferably made of the same material as the angle beams, such as aluminum or the like. The cross-members securely fix the beams in their relative parallel position, as well as assist in keeping the object or coil from contact with the floor of the vehicle flat-bed.

A header is preferably welded in place at either end of the support angle beams to prevent longitudinal sliding of the object off of the rack. This header may be an angle beam of aluminum or other material similar to the parallel angle beams and is securely attached to the ends of the latter so that one surface of the header is located underneath and the other facing the ends of the parallel angle support beams. The header thus serves to prevent the object in the rack from sliding longitudinally out of the end of the rack having the header. The header can also serve to reinforce the ends of the support beams and the overall rigidity of the rack. Also, if appropriate to the size of the cylindrical object or coil, a header can be placed at both ends of the support beams.

Two strips of rubber inserts are preferably disposed along and on top of the inwardly facing inclined surfaces of the angle beams and preferably secured thereto by plastic ties. This rubber material cushions the cylindrical object in the rack from contact with the hard metal surfaces of the rack and increases the frictional forces between the object and the rack to assist in preventing hazardous sliding of the object within the rack. Belting material can preferably provide an adjusting means to accommodate various objects with different diameters. As to the latter, the belting material can be doubled or likewise combined and shimmed between the cylindrical object and the support beams to alter the relative distance between opposed supporting surfaces of the angle support beams and to assure the object has a tight fit in the rack.

The rack of the present invention is also capable of being secured to the floor of the flat-bed to prevent the shifting of the rack thereon and increase safety during transportation. The portion of the cross-members which extend outside the angle support beams may be provided with holes that register with holes in the floor, preferably just aft of a cross-beam of the frame underneath the trailer floor. A pin or round bar with a head can be removable or permanently placed in each hole on one side or end of the rack through the floor to rest against the cross-beam. This securement improves upon the safety of the rack by preventing any movement of the rack during transportation.

Alternatively, the floor of the flat-bed may be provided with a stopper that is bolted to a cross-beam of the trailer frame and provided with at least one raised tongue to be received by a slot. The rack is provided with a slot in the header or a side slot structure formed by the inside surface of a shallow inverted channel beam securely attached generally logitudinally centrally to the outwardly facing portion of either support beam. Either slot may be used depending on the chosen orientation of the rack. Once the tongue is placed in the chosen slot, the stopper abuts the header or side slot structure, and movement of the rack on the floor in the direction of the stopper, usually the forward direction, is thereby prevented. Also, the stopper may have two tongues, one each on opposite sides of the stopper to each be received by a slot of a rack. In addition, lateral movement of the rack may be prevented by providing the outside portions of at least two cross-members with means to receive chains. Preferably the means are short pieces of angle beams similar to that used for the support beams, and the extensions of each short angle beam is welded or the like to the top of a cross-member and the adjacent outwardly facing portion of the support beam. Preferably, a pair of these short beams on each longitudinal side of the rack may then each be threaded by a chain with each end of the chains secured to the trailer by conventional means.

The rack is easily removable when not in use, lightweight, and inexpensive to manufacture by virtue of the use of readily available standardized parts.

The foregoing together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
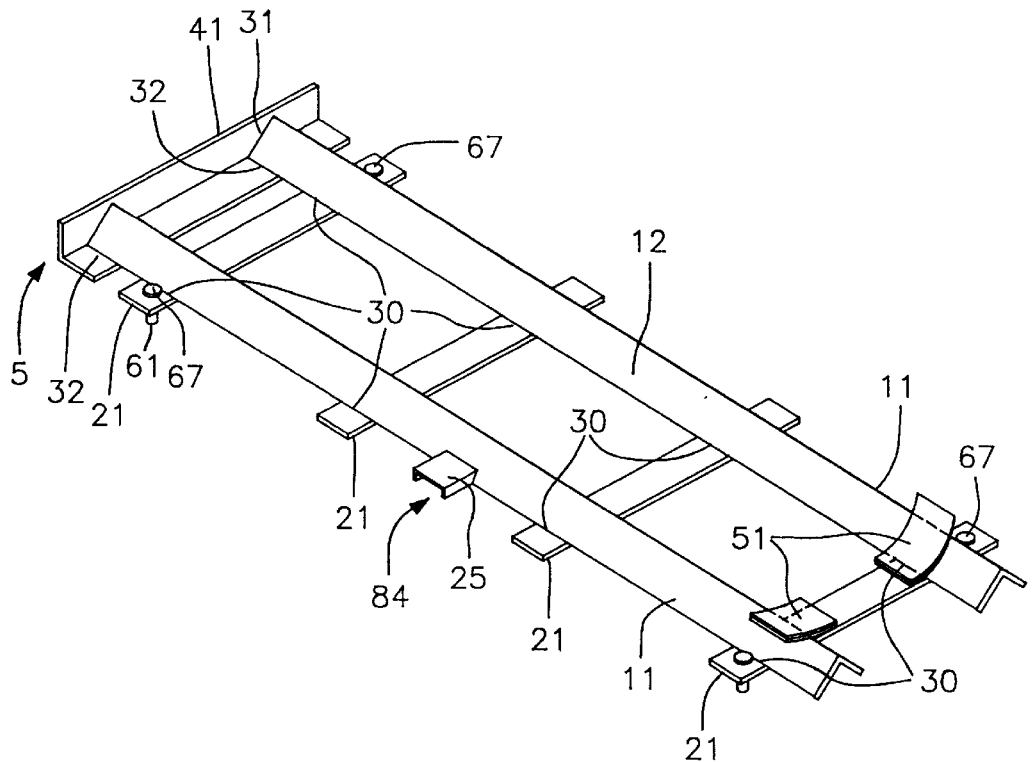
FIG. 1 is a perspective view of a rack in accordance with the present invention.
Figure 2:
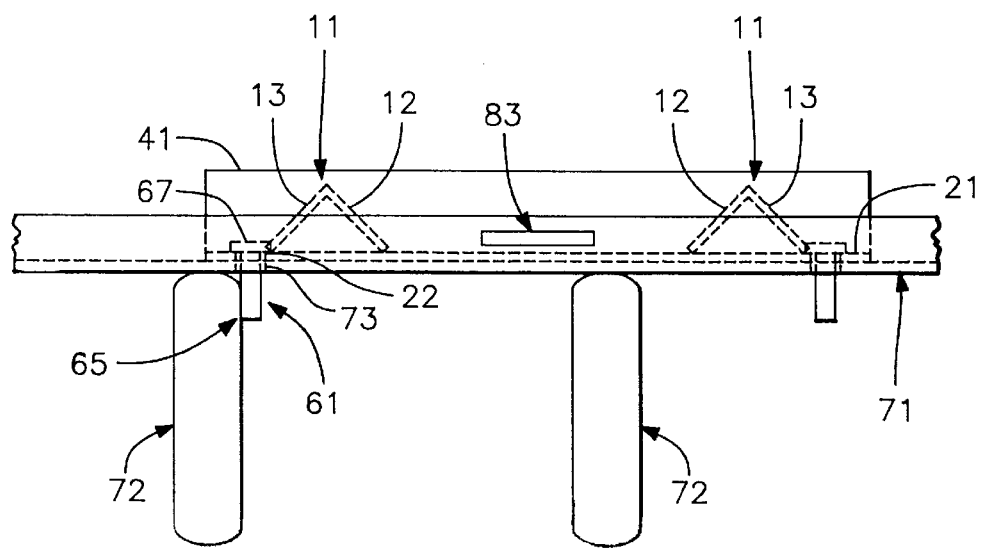
FIG. 2 is an end view of the rack of FIG. 1.

Referring to FIGS. 1 and 2, a rack of the present invention for supporting cylindrically shaped objects is shown generally by the number 5. Rack 5 has two substantially parallel metal angle support beams 11, preferably separated by about 19 inches for supporting a cylindrical object with a nominal diameter of four feet. The beams may be of any suitable strong rigid material, including metals and plastics. Lightweight metals, such as aluminum and aluminum alloys are preferred. For convenience, aluminum right angle type beams sold in standardized sizes, preferably 3 inch by 3 inch by ⅜ inch aluminum angle beams with a length of 7½ feet, can readily be utilized. The angle beams 11 are preferably each securely attached to a plurality of flat, plate cross-members 21, such as by welding as at 30 on the inside and outside of the angle beams 11. The cross-members 21 are located generally perpendicularly to the support beams 11. Although as few as two cross-members could be used, three to five cross-members are preferred, with four most preferred. The cross-members 21 are preferably made of the same material as the support beams 11 for ease of manufacture and appearance, and, for convenience, the type sold in standardized sizes, preferably 4 inch by ⅜ inch thick aluminum stock with a length of 30 inches, can be utilized. At one or both ends of the pair of angle beams 11 is a header 41 preferably made of the same material as the support beams 11. Preferably, a standardized aluminum right angle beam such as a 4 inch by 4 inch by ⅜ inch beam 30 inches long may be used. The header 41 is securely attached to the ends of the angle beams 11, as by welding at 31 and 32 or the like.

Figure 3:
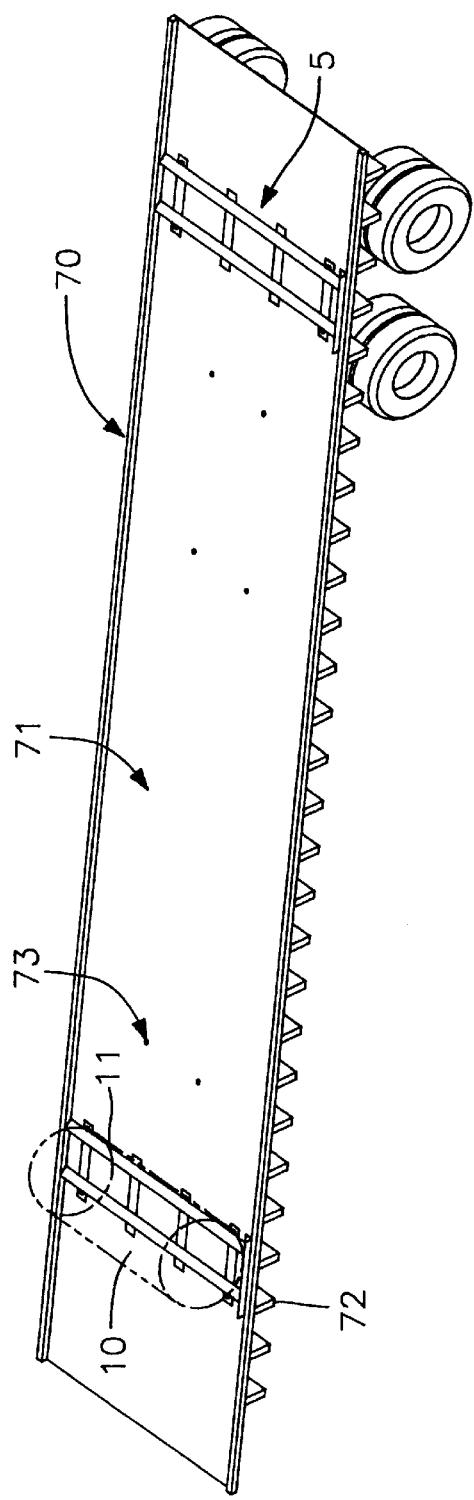
FIG. 3 is a perspective view of two racks placed on a vehicle flatbed to carry cylindrical objects in the "vertical" position.
Figure 5:
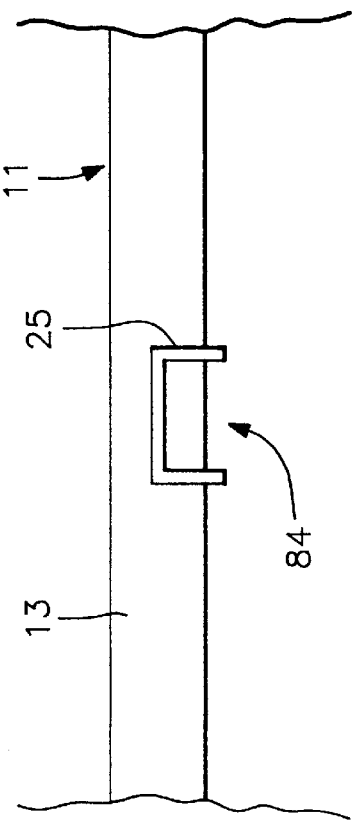
FIG. 5 is a side view of the rack showing the side slot structure of an alternative embodiment.

Each of the angle support beams 11 provides an inwardly facing inclined portion 12 that contacts the object or coil near its base, as seen in FIG. 3, and prevents the object from rolling to either side out of the rack during transport. The outwardly facing portions of each of the angle support beams 11 form a reinforcing backing 13 that supports the inwardly facing portion 12 in an inwardly facing inclined position along the entire length of the angle support beam 11.

Figure 4:
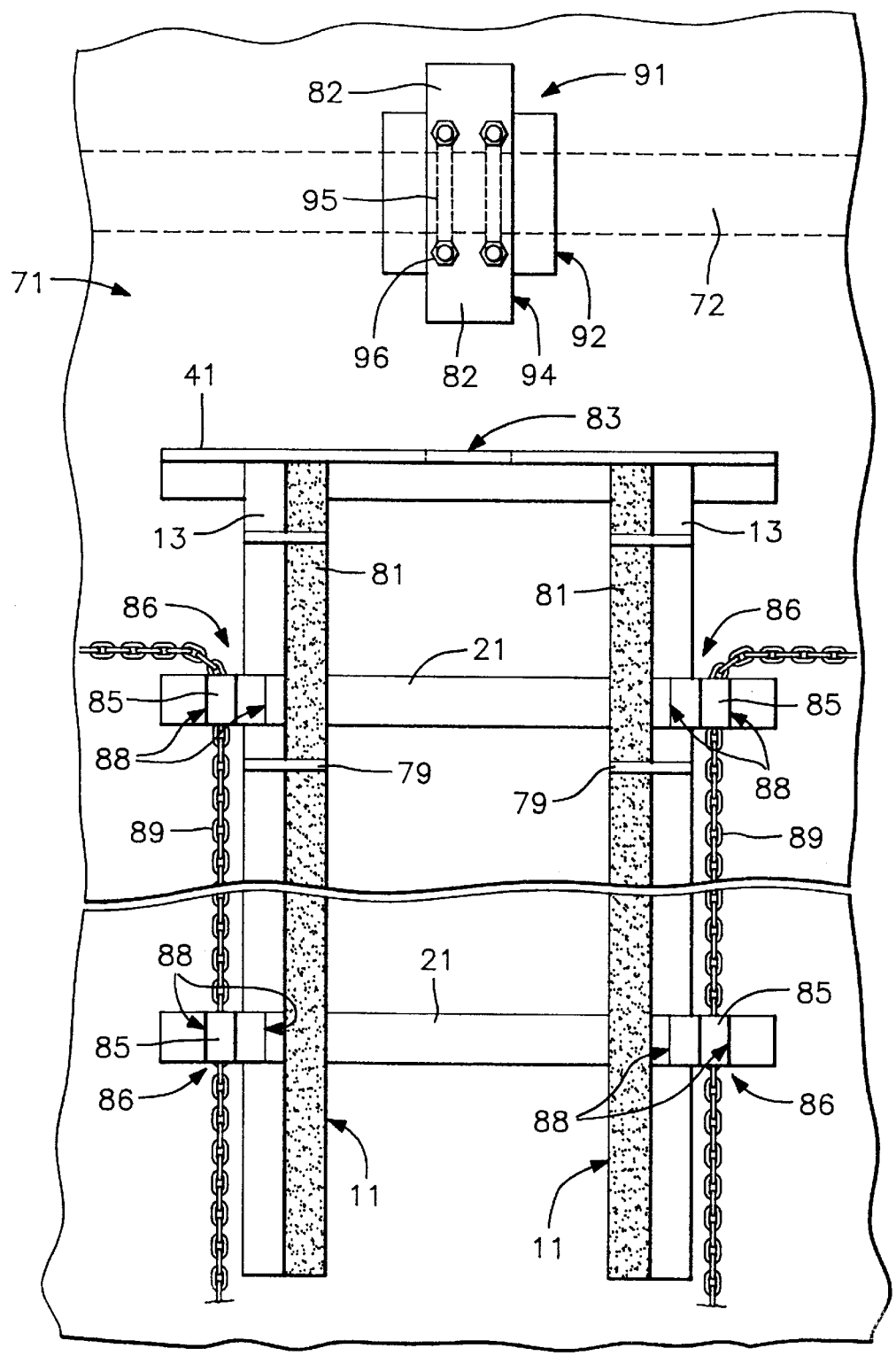
FIG. 4 is a top view of an alternative means to secure a rack on a vehicle flatbed.

The inwardly facing portions 12 are each preferably covered with a non-skid insert 81, as shown in FIG. 4, preferably made from rubber and secured by plastic ties 79 or such so that the insert 81 may readily be replaced. The material 81 cushions the cylindrical object from the hard surfaces of the angle support beams 11 and provides frictional forces to keep the object from sliding in the rack 5.

To provide a tight fit of the object or coil 10 in the rack 5 between the angle support beams 11, strips 51 of rubber belting material well known in the art are preferably fitted or shimmied between the object 10 and each of the support beams 11. By adjusting the number of layers of these strips 51, the effective distance between the angle beams 11 can be affected to accommodate different objects with different diameters and keep a desirably tight fit of the object 10 in the rack 5.

The rack 5 is preferably secured to the floor of the flatbed 71 by pins 61. The pins 61 are placed in holes 22 formed in the cross-members 21, preferably on the outward side from the angle beams 11 where cross-members 21 are sufficiently extended. Flatbed holes 73 are located on the floor of the flatbed 71 preferably just aft of a crossbeam 72 of the frame of the trailer. The pins 61 are received in the flatbed holes 73 and preferably rest against the rear side of the cross-beams 72, as at 65 in FIG. 2. The pins 61 prevent the rack from sliding forward on the flatbed floor 71. Pins 61 also have a head portion 67 larger than the diameter of the holes 22 to prevent the pins 61 falling therethrough. The pins 61 may be secured in their position such as being threaded with a nut underneath the floor 71 or may be otherwise secured, if desired.

As an alternative embodiment for securing the rack 5 from sliding on the flatbed floor 71, a stopper 91 is secured to a cross-beam 72 of the frame of the flatbed, as shown in FIG. 4, preferably by U-bolts 95, such as 8 inch by ½ inch, that wrap about the cross-beam 72 and nuts 96. Stopper 91 preferably includes a bottom plate 92, preferably a ½ inch thick plate of aluminum stock 6 inches long and 8 inches wide, and a top plate 94, preferably made from ⅜ inch aluminum stock 8 inches long and 4 inches wide, that is preferably welded to the bottom plate 92 generally centrally along the longitudinal center line of plate 92. The extra length of the top plate 94 in relation to the length of the bottom plate 92 forms a raised extended tongue 82, that in the prefered form is 4 inches by 4 inches, and projects outwardly from the stopper in alignment with the longitudinal center of the trailer. Tongue 82 is received by a comparably sized slot 83 formed in the header 41 when the rack is aligned longitudinally with the trailer 70. When the rack is aligned "vertically" the tongue 82 may be received in a comparably sized side slot structure 84 that is preferably formed by a comparably sized inverted channel beam 25 which is preferably securely attached to the outwardly facing portion 13 of a support beam 11 at generally the center of the beams length, as by welding or such. When the slot 83 or 84 is engaged with tongue 82, the rack 5 will thereby rest against the stopper 91 preventing forward movement of the rack 1. Alternatively, the stopper 91 may also be provided with a tongue 82 on an opposite side of the stopper 91 to the first tongue 82, as shown in FIG. 4, so that two racks 5 may be secured by the stopper 91. To prevent lateral movement of the rack 5, the outwardly extended portions of the cross-beams 21 are preferably provided with brackets to receive a chain 89 with ends secured to the trailer 70 in a manner well known in the art. Preferably two cross-members 21 will each have brackets as at 86 on each end to provide a pair of brackets on each side of a rack 5. The bracket may preferably be a short angle beam 85 disposed parallel to the support beams 11 with apex directed upwardly, and preferably made of a similar material as the support beams 11, such as aluminum or the like. The short beam 85 is then securely attached to the rack 5, preferably by welding as at 88, with one extension of the beam 85 secured to the top of the cross-member 21 and the other extension to the adjacent outwardly facing portion 13 of the support beam 11.

The operation of the rack 5 will now be described with reference to the drawings. The cylindrical object rack 5 is placed on the flatbed 71 of a vehicle in a desired location and direction. If the cylindrical object is to be carried transversely relative to the length of the trailer, i.e. the "vertical" or "suicide" position as shown in FIG. 3, the rack 5 is preferably secured to the flatbed by being so positioned that the holes 22 along one longitudinal side of rack 5 are registered with the flatbed holes 73. A pin 61 is preferably inserted through each hole 22 through flatbed hole 73 to rest abutted to the rearward side of cross-beam 72, as at 65 shown in FIG. 2. Depending on the diameter of the cylindrical object 10 relative to the distance between the angle support beams 11, the belting strips 51 may be one or more layers that act as shims between the inward facing inclined surface 12 and the cylindrical object 10 to assure a secure fit of the object 10 in rack 5.

In the position of the rack 5 on the flatbed 71 as shown in FIG. 3, one or more cylindrical objects 10 are preferably loaded from the side of the trailer, usually by forklift, onto the rack 5. Rack 5 may be loaded to fill its entire length. Chains are applied over the object(s) 10 transversely, and additionally through the longitudinal center where the object 10 is a coil with a center core, and the ends of the chains are attached to the trailer with binders in a manner well known in the art.

In another orientation where the cylindrical object 10 is to be transported with its length aligned with the length of the trailer, the rack 5 is preferably disposed on the flatbed 71 with the header 41 in the forward position on the rack 5. A pair of holes 22 on a cross-member 21 are registered with holes 73 on the flatbed 71. The pins 61 are inserted in an identical manner as described above to secure the rack 5 from sliding. When this orientation of the object 10 is desired, the coils are typically loaded via a crane. The leading object 10 is abutted against the header 41 to prevent forward movement, and any additional objects 10 are succesively loaded directly behind the leader. Also, the rack 5 may be constructed to any length consistent with the length of the flatbed so that multiple objects 10 may be loaded onto the same rack 5, or alternatively, a plurality of aligned racks 5 may be positioned end to end. The object(s) 10 are then secured to the rack 1 with chains by conventional means as discussed above.

The rack 5 may also be secured to the flatbed 71, in an alternative embodiment. With stopper 91 secured to a cross-beam 72 of the trailer frame, the slot 83 or 84, depending on the orientation of the rack 5 on the flatbed 71, receives tongue 82 as the rack is pushed into position, securing the rack 1 from forward movement. Two chains 89 are each preferably threaded through the pair of short beams 85 on a longitudinal side of the rack 5, one chain being for each pair. If the rack is aligned with the length of the trailer 70, as shown in FIG. 4, slot 83 is utilized, and and the ends of each chain 89 are secured to the adjacent side of the trailer. On the other hand, if the rack 5 is in the "vertical" position, as shown in FIG. 3, slot 84 is utilized, and the ends of each chain 89 are secured to opposite sides of the trailer 70. The object(s) 10 are then loaded in a manner as previously discussed above.

It should be appreciated that the scope of the invention is not limited to the precise embodiments described, and the foregoing is considered as illustrative only of the principles of the invention. For instance, the rack of the present invention could be used on any vehicle, such as train, ship, or plane. Additionally, the rack could be used to secure any object that is substantially cylindrical in addition to coils. While the invention has been described herein in conjunction with preferred embodiments thereof, it is evident that numerous alternatives, modifications, and variations will be apparent to those skilled in the art. As such, the preferred embodiments of the invention as set forth herein, are intended to be illustrative, and it is not desired to limit the invention to the exact construction and operation shown and described. Accordingly, all suitable changes, modifications, and equivalents may be made or resorted to, falling within the true spirit and full scope of the invention as described herein and defined in the appended claims.

What is claimed is:

1. A rack for securing cylindrically shaped objects for transportation on a vehicle flatbed, comprising:
    a pair of substantially parallel support beams, each of said support beams being an angle beam including an inwardly facing inclined portion and an integral reinforcing inclined backing portion to support said inwardly facing inclined portion with an apex of said angle beam pointing upwardly when installed on the vehicle flatbed;
    at least two flat cross-members disposed generally perpendicularly to and secured to said parallel support beams at spaced locations therealong by a free end of each said inwardly facing inclined portion being attached at at least one location to said cross-members, and said at least one location being spaced from a free end of each respective said reinforcing inclined backing portion which are attached to said cross-members; and
    means for securing said rack from sliding on the flatbed.

2. The rack as defined in claim 1, and further comprising at least one header including at least a vertical portion, said header being securely attached to at least one end of said pair of beams to prevent forward movement of one of said objects.

3. The rack as defined in claim 2, wherein said means for securing said rack includes a stopper with a raised extended tongue for securely attaching the rack on top of the flatbed, said header formed with a slot in said vertical portion aligned to receive the tongue, and at least one outside portion extending outwardly from said pair of beams of at least one of said cross-members with a bracket structure to receive a chain secured to the flatbed.

4. The rack as defined in claim 3, wherein said bracket structure is a short angle beam with its length disposed substantially parallel to said pair of parallel beams, said short beam including two extensions with one welded to a top side of said outside portion and the other welded to the adjacent reinforcing backing portion of a respective one of said support beams with the apex of the short angle beam directed upwardly.

5. The rack as defined in claim 1, further comprising a rubber insert disposed along said inwardly facing inclined portions of at least one of said beams to cushion and secure said cylindrical objects, said insert being removably secured.

6. The rack as defined in claim 1, wherein said means for securing said rack includes at least one end of at least one of said cross-members extending outwardly from said pair of beams forming an outside portion with a vertical passageway for receiving a pin including a head, said pin being of sufficient length to extend through the vertical passageway of the outside portion and a vertical passageway in said flatbed.

7. The rack as defined in claim 1, wherein said means for securing said rack includes a stopper with a raised extended tongue for securely attaching said stopper on top of the flatbed and a side slot structure securely attached upon said reinforcing backing portion and formed with a slot to receive said tongue and prevent movement of said rack toward said stopper.

8. The rack as defined in claim 1, wherein each said cylindrically shaped object is a large coil of stock material.

9. A rack for securing objects for transportation on a vehicle flatbed, comprising;
    a pair of opposed aluminum support beams, each of said support beams being an angle beam including an inwardly facing inclined portion and an integral reinforcing portion to substantially support said inclined portion with an apex of said angle beam pointing upwardly when installed on the vehicle flatbed;
    at least two flat cross-members disposed generally transversely and secured to said opposed beams by a free end of each said inwardly facing inclined portion being welded at at least one location to said cross-members, and said at least one location being spaced from a free end of each respective said reinforcing portion which are welded to said cross-members and with ends of said cross-members extending outwardly of said opposed beams; and
    means to affix said cross-members and said rack to said vehicle flatbed.

10. The rack as defined in claim 9, wherein at least one of said opposed support beams includes rubber inserts secured to and at least partially covering said inwardly facing portion.

11. The rack as defined in claim 9, wherein the means for affixing said rack includes at least one of said ends of said cross-members being formed with a vertical passageway for receiving a pin including a head, said pin having sufficient length to extend through said end and said flatbed.

12. The rack as defined in claim 9, wherein said means for affixing said rack includes a stopper with an extended raised tongue for securely attaching the rack on top of the flatbed of said vehicle and a header securely attached to one end of said pair of opposed beams including a vertical portion formed with a slot to receive said tongue and abut said rack against said stopper.

13. The rack as defined in claim 12, wherein said means for affixing said rack further includes a bracket structure securely attached to said ends of said cross-members to receive a chain secured to the flatbed.

14. A rack for securing cylindrically shaped objects for transportation on a vehicle flatbed, comprising:
   a pair of substantially parallel support beams, each including an inwardly facing inclined portion and a reinforcing backing portion to support said inclined portion;
   at least two flat cross-members disposed generally perpendicularly to and secured to said parallel support beams at spaced locations therealong; and
   means for securing said rack from sliding on the flatbed,
   at least one header including at least a vertical portion, said header being securely attached to at least one end of said pair of beams to prevent forward movement of one of said objects,
   said means for securing said rack including a stopper with a raised extended tongue for securely attaching the rack on top of the flatbed, said header being formed with a slot in said vertical portion aligned to receive the tongue, and at least one outside portion extending outwardly from said pair of beams of at least one of said cross-members with a bracket structure to receive a chain secured to the flatbed.

15. The rack as defined in claim 14, wherein said bracket structure is a short angle beam with its length disposed substantially parallel to said pair of parallel beams, said short beam including two extensions with one welded to a top side of said outside portion and the other welded to the adjacent reinforcing backing portion of said beam with the apex of the angle beam directed upwardly.

16. A rack for securing cylindrically shaped objects for transportation on a vehicle flatbed, comprising:
   a pair of substantially parallel support beams, each including an inwardly facing inclined portion and a reinforcing backing portion to support said inclined portion;
   at least two flat cross-members disposed generally perpendicularly to and secured to said parallel support beams at spaced locations therealong; and
   means for securing said rack from sliding on the flatbed,
   said means for securing said rack includes a stopper with a raised extended tongue for securely attaching said stopper on top of the flatbed and a side slot structure securely attached upon said reinforcing backing portion and formed with a slot to receive said tongue and prevent movement of said rack toward said stopper.

17. A rack for securing objects for transportation on a vehicle flatbed, comprising;
   a pair of opposed support beams, each including an inwardly facing inclined portion and a reinforcing portion to substantially support said inclined portion;
   at least two flat cross-members disposed generally transversely and secured to said opposed beams with ends extending outwardly of said opposed beams; and
   means to affix said cross-members and said rack to said vehicle flatbed, said means for affixing said rack including a stopper with an extended raised tongue for securely attaching said rack on top of the flatbed of said vehicle and a header securely attached to one end of said pair of opposed beams including a vertical portion formed with a slot to receive said tongue and abut said rack against said stopper.

18. The rack as defined in claim 17, wherein said means for affixing said rack further includes a bracket structure securely attached to said ends of said cross-members to receive a chain secured to the flatbed.

* * * * *